(12) United States Patent
Nishimura

(10) Patent No.: US 8,116,068 B2
(45) Date of Patent: Feb. 14, 2012

(54) SOLID ELECTROLYTIC CAPACITOR

(75) Inventor: Koichi Nishimura, Kadoma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 197 days.

(21) Appl. No.: 12/720,718

(22) Filed: Mar. 10, 2010

(65) Prior Publication Data

US 2010/0254071 A1    Oct. 7, 2010

(30) Foreign Application Priority Data

Apr. 1, 2009    (JP) ................ 2009-089280

(51) Int. Cl.
*H01G 9/00* (2006.01)

(52) U.S. Cl. ........ 361/523; 361/516; 361/519; 361/524; 361/525; 361/528

(58) Field of Classification Search ........... 361/523, 361/516–517, 519, 525, 528–529, 531, 524, 361/540–541; 29/25.01, 25.03
See application file for complete search history.

(56) References Cited

U.S. PATENT DOCUMENTS

| | | | | |
|---|---|---|---|---|
| 5,471,365 A * | 11/1995 | Nakamura et al. | ............ | 361/523 |
| 6,215,652 B1 | 4/2001 | Yoshida et al. | | |
| 6,816,357 B2 | 11/2004 | Takatani et al. | | |
| 7,038,903 B2 * | 5/2006 | Yano et al. | ............ | 361/528 |
| 7,126,813 B2 * | 10/2006 | Iida et al. | ............ | 361/528 |
| 7,248,460 B2 * | 7/2007 | Omura et al. | ............ | 361/502 |
| 7,433,175 B2 * | 10/2008 | Asami et al. | ............ | 361/524 |
| 8,014,127 B2 * | 9/2011 | Kasuga et al. | ............ | 361/523 |

FOREIGN PATENT DOCUMENTS

| | | |
|---|---|---|
| JP | 11-329902 A | 11/1999 |
| JP | 2003-347168 A | 12/2003 |

* cited by examiner

*Primary Examiner* — Nguyen T Ha

(74) *Attorney, Agent, or Firm* — Marvin A. Motsenbocker; Mots Law, PLLC

(57) ABSTRACT

A solid electrolytic capacitor includes an anode 2 made of a valve metal or an alloy thereof, a dielectric layer 3 provided on the surface of the anode 2, a conductive polymer layer 5 provided on the dielectric layer 3, and a cathode layer 6 provided on the conductive polymer layer 5. A fullerene layer 4 made of an insulating fullerene is provided between the dielectric layer 3 and the conductive polymer layer 5.

5 Claims, 2 Drawing Sheets

SOLID ELECTROLYTIC CAPACITOR

BACKGROUND OF THE INVENTION

1. Field of the Invention

This invention relates to solid electrolytic capacitors using an anode made of a valve metal or an alloy thereof.

2. Description of Related Arts

Tantalum solid electrolytic capacitors using a sintered tantalum powder body as an anode contain an oxide having a dielectric constant approximately twice larger than that of aluminum oxide and therefore can achieve high capacitance. For this reason, tantalum solid electrolytic capacitors have recently been used in a wide range of fields including cellular phones and personal computers.

Nevertheless, even higher capacitance has been demanded. Niobium has attracted much attention as an alternative anode material to tantalum. Oxides of niobium have dielectric constants approximately 1.8 times larger than that of tantalum oxide. Therefore, consideration has been given to the development of solid electrolytic capacitors using niobium for an anode (see, for example, Published Japanese Patent Application No. H11-329902).

However, if niobium is used for an anode, there arises a problem of high leakage current. In view of this problem, there is a demand for solid electrolytic capacitors capable of reducing the leakage current.

SUMMARY OF THE INVENTION

An object of the present invention is to provide a solid electrolytic capacitor capable of reducing the leakage current.

The present invention is directed to a solid electrolytic capacitor including an anode made of a valve metal or an alloy thereof, a dielectric layer provided on the surface of the anode, a conductive polymer layer provided on the dielectric layer, and a cathode layer provided on the conductive polymer layer. The solid electrolytic capacitor further includes a fullerene layer made of an insulating fullerene provided between the dielectric layer and the conductive polymer layer.

The reason why the use of a niobium anode leads to high leakage current is that the energy barrier between the dielectric layer and the conductive polymer layer has a small height and therefore current readily flows between these layers owing to the tunneling effect.

In the present invention, the fullerene layer made of an insulating fullerene is provided between the dielectric layer and the conductive polymer layer. Insulating fullerenes have high work functions. Therefore, if such an insulating fullerene is provided between the dielectric layer and the conductive polymer layer, the energy barrier between these layers can have a large height. Thus, current flow due to the tunneling effect can be suppressed and the leakage current can thereby be reduced.

Examples of insulating fullerenes that can be used to form the fullerene layer include C60, C70, C78 and mixtures of them. The fullerene layer in the present invention is preferably made substantially of C60, C70, C78 or a mixture thereof. The term "made substantially of" herein means that the fullerene layer is formed to contain 50% by mole or more of such a compound.

Herein, the term "insulating" of insulating fullerene means that the fullerene is not given electrical conductivity because it contains a dopant, such as a metal.

The fullerene layer may coat substantially the entire surface of the dielectric layer, but even if it coats at least part of the surface thereof, the effect of the present invention can be achieved. If the fullerene layer coats at least part of the surface of the dielectric layer, the state of electrons at the interface between the dielectric layer and the conductive polymer layer changes, whereby the effect of the present invention can be achieved.

The fullerene layer preferably coats the surface of the dielectric layer in a coverage of 15 to 150 μmol per square meter of the total surface area of the dielectric layer, and more preferably in a coverage of 50 to 100 μmol. If the coverage of the fullerene layer is below the above preferable range, the effect of reducing the leakage current may not sufficiently be achieved. On the other hand, if the coverage of the fullerene layer is over the above preferable range, there may arise a problem of reduction in capacitance, and the like.

The anode in the present invention is made of a valve metal or an alloy thereof and is not otherwise particularly limited. However, if niobium is used as a valve metal as described above without provision of a fullerene layer, the energy barrier between the dielectric layer, particularly made of niobium oxide, and the conductive polymer layer has a particularly small height. Thus, current readily flows between these layers owing to the tunneling effect, and the leakage current is thereby likely to increase. Therefore, the present invention is particularly useful for solid electrolytic capacitors in which the anode is made of niobium or a niobium alloy.

Effects of the Invention

According to the present invention, the leakage current can be reduced.

DETAILED DESCRIPTION OF PREFERRED EMBODIMENT

Hereinafter, the present invention will be described in detail with reference to an embodiment of the present invention, but the present invention is not at all limited to the following embodiment and can be practiced with appropriate modification without departing from the spirit and scope of the invention.

Figure 1:
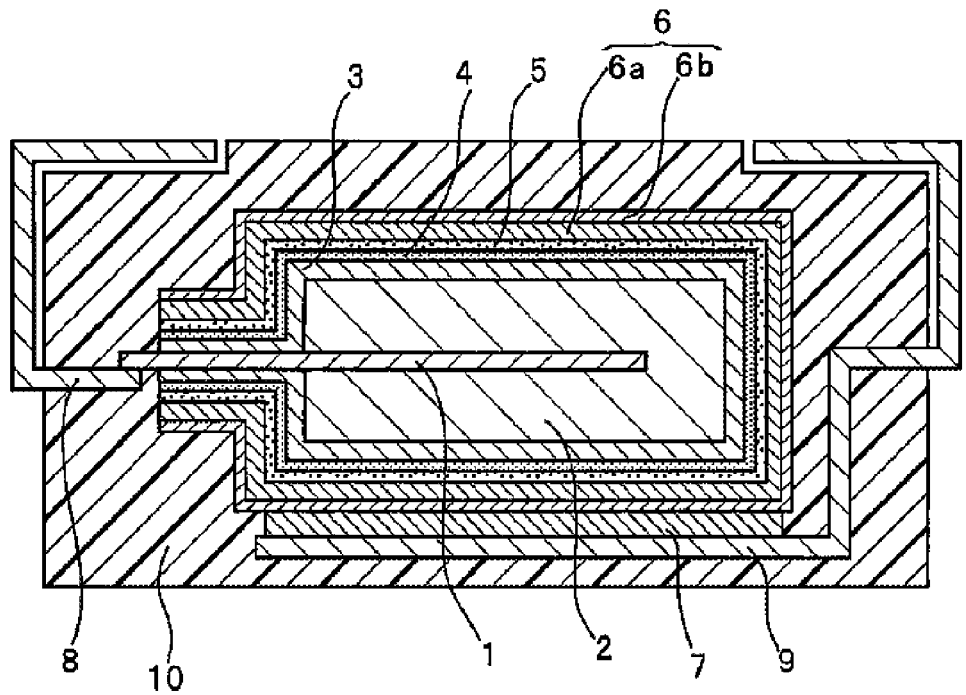
FIG. 1 is a schematic cross-sectional view showing a solid electrolytic capacitor according to an embodiment of the present invention.

FIG. 1 is a schematic cross-sectional view showing a solid electrolytic capacitor according to an embodiment of the present invention.

As shown in FIG. 1, an anode lead 1 is embedded in an anode 2. The anode 2 is produced by forming a powder made of a valve metal or an alloy thereof into a formed body and sintering the formed body. Therefore, the anode 2 is formed of a porous body. The porous body has a large number of fine pores formed to communicate between their insides and the outside, although they are not shown in FIG. 1. The anode 2 thus produced has, in this embodiment, the outer shape of an approximately rectangular box.

A dielectric layer 3 is formed on the surface of the anode 2. The dielectric layer 3 is formed, for example, by anodizing the surface of the anode 2. The dielectric layer 3 is also formed on the surfaces of the pores in the anode 2. Note that FIG. 1 schematically shows the dielectric layer 3 formed on the outside surfaces of the anode 2 but does not show the above-described part of the dielectric layer formed on the surfaces of the pores in the porous body.

A fullerene layer 4 made of an insulating fullerene is formed on the surface of the dielectric layer 3. The fullerene layer 4 is also formed on the part of the dielectric layer 3 lying on the surfaces of the pores in the anode 2.

Figure 2:
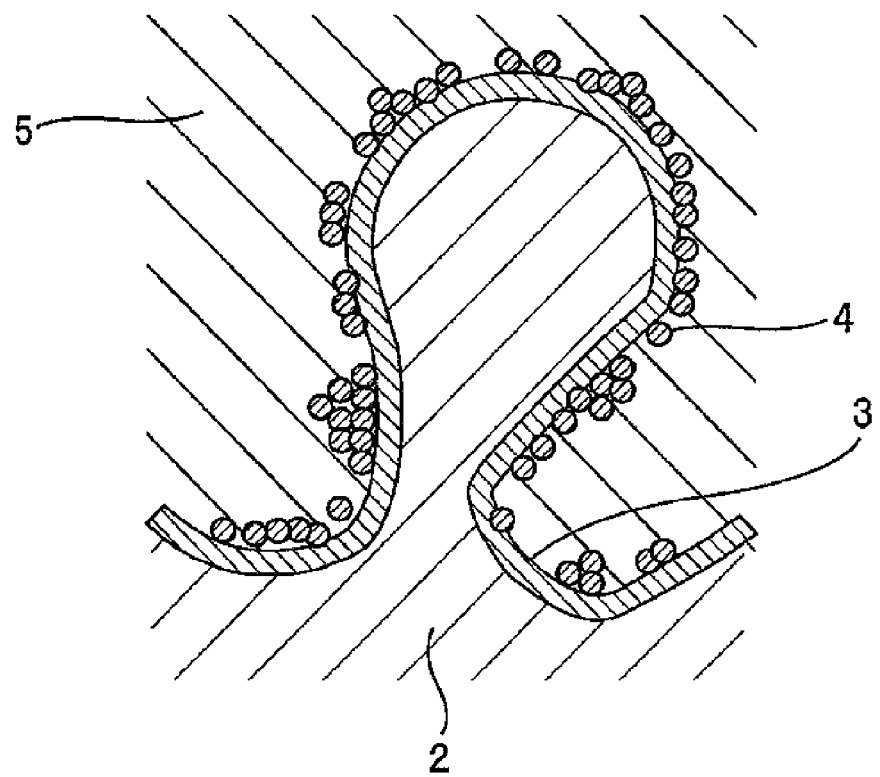
FIG. 2 is a schematic cross-sectional view showing a fullerene layer on the surface of a dielectric layer.

FIG. 2 is a schematic cross-sectional view showing a state of the fullerene layer 4 lying on the dielectric layer 3. As shown in FIG. 2, the fullerene layer 4 is formed by adhesion of fullerene to part of the surface of the dielectric layer 3. The fullerene layer 4 may not necessarily coat the entire surface of the dielectric layer 3 and, as shown in FIG. 2, may be provided to coat at least part of the surface of the dielectric layer 3.

Referring back to FIG. 1, a conductive polymer layer 5 is formed on the fullerene layer 4. Since the fullerene layer 4 is formed by adhesion of fullerene to part of the dielectric layer 3 as shown in FIG. 2, the conductive polymer layer 5 is formed on the dielectric layer 3 and the fullerene layer 4. In addition, the conductive polymer layer 5 is also formed on the parts of the dielectric layer and fullerene layer lying on the surfaces of the pores in the anode 2. FIG. 1 does not show the part of the conductive polymer layer formed on the surfaces of the pores in the anode 2 that is a porous body. The conductive polymer layer 5 is made of a conductive polymer, such as polypyrrole or polythiophene.

A carbon layer 6a is formed on the conductive polymer layer 5. The carbon layer 6a can be formed by applying carbon paste containing carbon particles on the conductive polymer layer 5 and then drying it.

A silver paste layer 6b is formed on the carbon layer 6a. The silver paste layer 6b can be formed by applying silver paste containing silver particles on the carbon layer 6a and then drying it. A cathode layer 6 is composed of the carbon layer 6a and the silver paste layer 6b.

A cathode terminal 9 is connected to the surface of the cathode layer 6 through a conductive adhesive layer 7. On the other hand, an anode terminal 8 is connected to the anode lead 1. A molded resin package 10 is formed so that the ends of the anode and cathode terminals 8 and 9 are extended to the outside.

In the manner described above, the solid electrolytic capacitor according to this embodiment is constructed.

Figure 3:
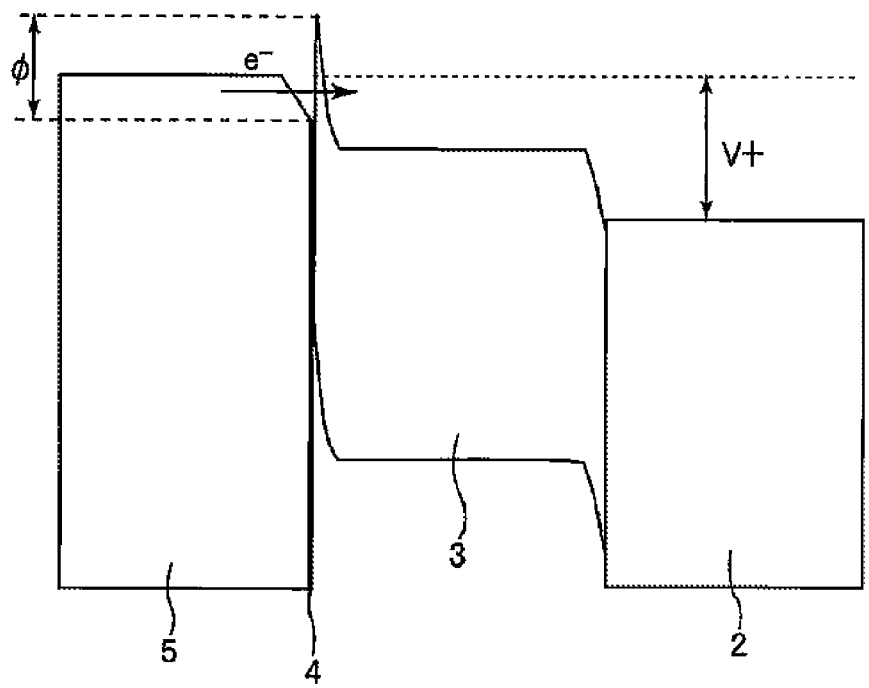
FIG. 3 is a schematic diagram showing the band structures of an anode, the dielectric layer, the fullerene layer and a conductive polymer layer of the solid electrolytic capacitor according to the above embodiment of the present invention.

FIG. 3 is a schematic diagram showing the band structures of the anode, the dielectric layer, the fullerene layer and the conductive polymer layer of the solid electrolytic capacitor according to this embodiment. The band structures shown in FIG. 3 are those under actual operating conditions in which a positive voltage is applied to the anode. In this embodiment, as described above, the fullerene layer 4 is provided between the dielectric layer 3 and the conductive polymer layer 5.

Figure 4:
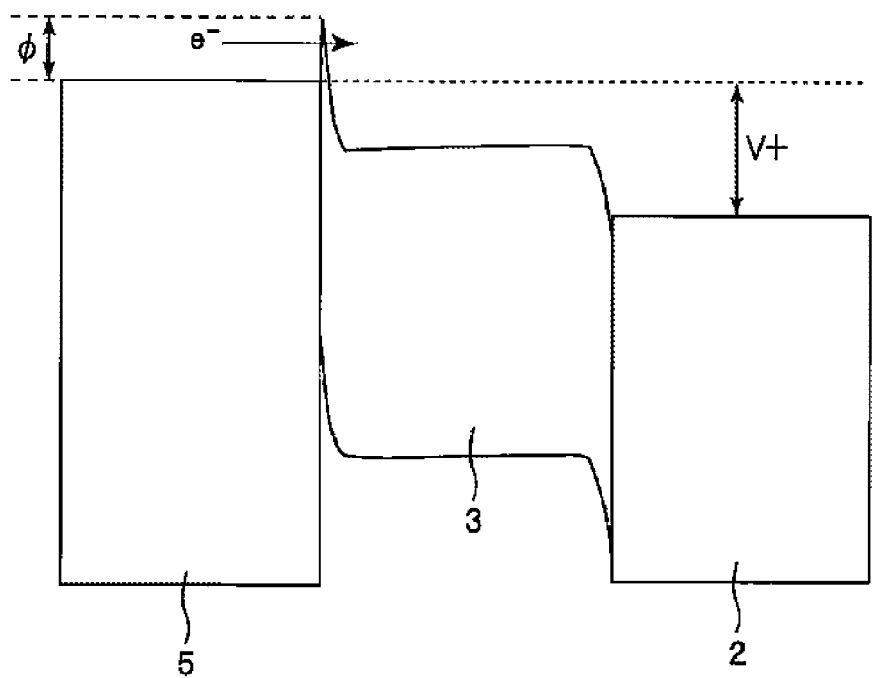
FIG. 4 is a schematic diagram showing the band structures of an anode, a dielectric layer and a conductive polymer layer of a conventional solid electrolytic capacitor.

FIG. 4 is a diagram showing the band structures of an anode, a dielectric layer and a conductive polymer layer of a conventional solid electrolytic capacitor. The band structures shown in FIG. 4 are also those under actual operating conditions in which a positive voltage is applied to the anode. As shown in FIG. 4, when a positive voltage is applied to the anode 2, an energy barrier exists between the conductive polymer layer 5 and the dielectric layer 3. However, because the height $\phi$ of the energy barrier is small, electrons can readily move from the conductive polymer 5 to the dielectric layer 3 owing to the tunneling effect. Therefore, a leakage current is produced. If the dielectric layer 3 is made of niobium oxide, then the height $\phi$ of the energy barrier between the dielectric layer 3 and the conductive polymer layer 5 is particularly small, and therefore leakage current due to the tunneling effect more readily flows.

In contrast to the above, if as shown in FIG. 3, a fullerene layer 4 is provided between the dielectric layer 3 and the conductive polymer layer 5, a large work function of fullerene increases the height $\phi$ of the energy barrier between the fullerene layer 4 and the dielectric layer 3. Thus, electrons are less likely to move from the conductive polymer layer 5 to the dielectric layer 3, whereby leakage current due to the tunneling effect can be reduced.

EXAMPLES

Hereinafter, the present invention will be described with reference to more specific examples, but the present invention is not limited to the following examples.

Examples 1 to 10

<Step 1>
Niobium powder with an average particle size of approximately 1 μm was used. The powder was formed into a formed body with a lead made of niobium embedded therein. The formed body was sintered at approximately 1400° C., thereby producing an anode formed of a porous sintered body in which the anode lead made of niobium was embedded.

<Step 2>
The anode produced in Step 1 was anodized by immersing it in an approximately 0.1% by weight aqueous solution of phosphoric acid held at approximately 60° C. and applying a constant voltage of 50 V to the anode in the solution for 10 hours. Thus, a dielectric layer made of niobium oxide was formed on the surface of the anode.

<Step 3>
Varying amounts of fullerene (C60 with a purity of 99.5% by weight, manufactured by Sigma-Aldrich Corporation) were dissolved in approximately 100 ml portions of toluene to give ten different concentrations ranging from 0.03 to 0.3 g/liter as shown in Table 1. Then, each of the residues of the solutions was removed by filtration through a 0.2 μm membrane filter, thereby preparing ten kinds of fullerene solutions having different concentrations.

Next, a plurality of anodes produced in Step 2 were immersed into the ten kinds of fullerene solutions for five minutes. Then, each anode was picked up from the solution and dried in a draft oven to evaporate toluene, thereby forming a fullerene layer on the surface of the dielectric layer.

In the above manner, ten kinds of elements were produced which had dielectric layers coated with different amounts of fullerene. The amounts of fullerene adhering to the respective surfaces of these elements were measured in the following manner.

For each kind of element including fullerene adhering thereto, 20 samples were immersed into separate 10 ml portions of toluene to dissolve fullerene adhering to their surfaces into toluene. Then, the toluene solutions were moved to different watch glasses and allowed to dry naturally. Thereafter, fullerene left on each watch glass was dissolved again in 100 µl of toluene, and a 20 µl portion of the solution was sampled and analyzed by liquid chromatography to determine the quantity of fullerene.

Furthermore, the element samples before adhesion of fullerene were measured in terms of the surface areas of their dielectric layers by the BET method.

Based on the surface area of the dielectric layer of each sample measured in the above manner and the quantity of fullerene adhering to the sample, the coverage (µmol/m$^2$) of fullerene per total surface area of the dielectric layer was calculated. The calculation results for all kinds of elements are shown in Table 1.

<Step 4>

For each element sample after the formation of the fullerene layer, a conductive polymer layer was formed on the fullerene layer by forming polypyrrole on it by chemical polymerization and/or electrolytic polymerization. Thereafter, a carbon layer was formed by applying carbon paste on the conductive polymer layer, and a silver paste layer was then formed by applying silver paste on the carbon layer. Next, a cathode terminal was connected to the silver paste layer through a conductive adhesive layer, an anode terminal was connected to the anode lead, followed by encapsulation with a molded resin package. In this manner, ten types of solid electrolytic capacitors A to J were produced, 20 for each type.

Comparative Example 1

Twenty solid electrolytic capacitors X were produced in the same manner as in Example 1 except that in Step 3 the fullerene layer was not formed.

[Measurements of Leakage Current and Capacitance]

Each of the produced solid electrolytic capacitors was measured in terms of leakage current and capacitance. The leakage current was measured by applying a voltage of 15 V to the solid electrolytic capacitor and measuring the electric current 20 seconds after the voltage application. The capacitance was measured using an LCR meter with a frequency of 120 Hz.

The capacitors having a CV value of not more than 0.1 were determined to be conforming, and the yield out of 20 capacitors of each type was calculated. The calculation results are shown in Table 1. In addition, the average leakage currents converted into CV values are also shown in Table 1.

TABLE 1

|  |  | Concentration of C60 Solution (g/L) | Coverage (µmol/m$^2$) | Yield (%) | Average Leakage Current (CV Value Equivalent) |
|---|---|---|---|---|---|
| Ex. 1 | Solid Electrolytic Capacitor A | 0.03 | 11 | 70 | 0.15 |
| Ex. 2 | Solid Electrolytic Capacitor B | 0.06 | 15 | 75 | 0.09 |
| Ex. 3 | Solid Electrolytic Capacitor C | 0.09 | 32 | 75 | 0.07 |
| Ex. 4 | Solid Electrolytic Capacitor D | 0.12 | 50 | 85 | 0.05 |
| Ex. 5 | Solid Electrolytic Capacitor E | 0.15 | 61 | 85 | 0.04 |
| Ex. 6 | Solid Electrolytic Capacitor F | 0.18 | 75 | 85 | 0.04 |
| Ex. 7 | Solid Electrolytic Capacitor G | 0.21 | 100 | 85 | 0.05 |
| Ex. 8 | Solid Electrolytic Capacitor H | 0.24 | 117 | 80 | 0.08 |
| Ex. 9 | Solid Electrolytic Capacitor I | 0.27 | 150 | 75 | 0.09 |
| Ex. 10 | Solid Electrolytic Capacitor J | 0.30 | 159 | 70 | 0.13 |
| Comp. Ex. 1 | Solid Electrolytic Capacitor X | — | — | 65 | 0.18 |

Table 1 shows that the solid electrolytic capacitors A to J of Examples 1 to 10, in each of which a fullerene layer was provided between the dielectric layer and the conductive polymer layer according to the present invention, had lower average leakage currents and exhibited higher yields than the solid electrolytic capacitors X of Comparative Example 1. This can be attributed to the fact that the existence of fullerene having a large work function increases the height of the energy barrier to reduce the tunneling current, resulting in reduced leakage current.

It can be seen from the results of Table 1 that the coverage of fullerene is preferably within the range of 15 to 150 µmol/m$^2$ and more preferably within the range of 50 to 100 µmol/m$^2$.

Although in the above examples C60 was used as fullerene, the same effects have been observed also when C70 or C78 was used as fullerene.

Although in the above examples niobium was used as a valve metal forming an anode, the present invention is also applicable to solid electrolytic capacitors in which the anode is formed using other valve metals, such as tantalum, titanium, aluminium, hafnium or zirconium.

Although in the above examples polypyrrole was used for a conductive polymer layer, the present invention is also applicable to solid electrolytic capacitors in which the conductive polymer layer is formed using other kinds of conductive polymers, such as polyethylene dioxythiophene.

What is claimed is:

1. A solid electrolytic capacitor including an anode made of a valve metal or an alloy thereof, a dielectric layer provided on the surface of the anode, a conductive polymer layer provided on the dielectric layer, and a cathode layer provided on the conductive polymer layer, wherein
    the solid electrolytic capacitor further includes a fullerene layer made of an insulating fullerene provided between the dielectric layer and the conductive polymer layer.

2. The solid electrolytic capacitor according to claim 1, wherein the fullerene layer is made of C60, C70, C78 or a mixture thereof.

3. The solid electrolytic capacitor according to claim 1, wherein the fullerene layer coats the surface of the dielectric layer in a coverage of 15 to 150 μmol per square meter of the total surface area of the dielectric layer.

4. The solid electrolytic capacitor according to claim 1, wherein the fullerene layer coats the surface of the dielectric layer in a coverage of 50 to 100 μmol per square meter of the total surface area of the dielectric layer.

5. The solid electrolytic capacitor according to claim 1, wherein the anode is made of niobium or an alloy thereof.

* * * * *